(12) United States Patent  
Muthusamy

(10) Patent No.: US 6,738,792 B1  
(45) Date of Patent: May 18, 2004

(54) PARALLEL MASK GENERATOR

(75) Inventor: Karthikeyan Muthusamy, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 663 days.

(21) Appl. No.: 09/802,673

(22) Filed: Mar. 9, 2001

(51) Int. Cl.$^7$ ................................................ G06F 9/30
(52) U.S. Cl. ..................................... 708/200; 712/224
(58) Field of Search ........................... 708/200; 712/224

(56) References Cited

U.S. PATENT DOCUMENTS

| | | |
|---|---|---|
| 4,044,338 A | 8/1977 | Wolf |
| 4,085,447 A | 4/1978 | Pertl et al. |
| 4,180,861 A | 12/1979 | Armstrong et al. |
| 4,453,212 A | 6/1984 | Gaither et al. |
| 4,807,115 A | 2/1989 | Torng |
| 4,858,105 A | 8/1989 | Kuriyama et al. |
| 4,870,563 A | 9/1989 | Oguchi |
| 4,945,509 A * | 7/1990 | Barrett et al. ............. 712/224 |
| 5,113,515 A | 5/1992 | Fite et al. |
| 5,129,066 A * | 7/1992 | Schmookler ............. 712/224 |
| 5,210,833 A | 5/1993 | Kaneko |
| 5,226,126 A | 7/1993 | McFarland et al. |
| 5,226,130 A | 7/1993 | Favor et al. |
| 5,287,467 A | 2/1994 | Blaner et al. |
| 5,317,701 A | 5/1994 | Reininger et al. |
| 5,327,543 A | 7/1994 | Miura et al. |
| 5,388,233 A | 2/1995 | Hays et al. |
| 5,438,668 A | 8/1995 | Coon et al. |
| 5,488,710 A | 1/1996 | Sato et al. |
| 5,513,330 A | 4/1996 | Stiles |
| 5,586,276 A | 12/1996 | Grochowski et al. |

(List continued on next page.)

FOREIGN PATENT DOCUMENTS

| | | |
|---|---|---|
| EP | 0259095 | 3/1988 |
| EP | 0381471 | 8/1990 |
| EP | 0459232 | 12/1991 |
| EP | 0651320 | 5/1995 |
| EP | 0651323 | 5/1995 |
| GB | 2263985 | 8/1993 |
| GB | 2263987 | 8/1993 |
| GB | 2281422 | 3/1995 |

OTHER PUBLICATIONS

Intel, "Pentium Processor Family User's Manual," vol. 1, Pentium Processor Family Data Book, 1994, pp. 2–1 to 2–4.

Michael Slater, "AMD'S K5 Designed to Outrun Pentium," Microprocessor Report, vol. 8, No. 14, Oct. 24, 1994, 7 pages.

Rupley and Clyman, "P6: The Next Step?," PC Magazine, Sep. 12, 1995, 16 pages.

Tom R. Halfhill, "AMD K6 Takes On Intel P6," BYTE, Jan. 1996, 4 pages.

Holtz and Parchinski, "Mark Bit Generator," IBM Technical Disclosure Bulletin, vol. 20, No. 9, Feb. 1978, 3 pages.

Liptay, Holtz, Parchinski, "Mask–Controlled Byte Handling," IBM Technical Disclosure Bulletin, vol. 20, No. 9, Feb. 1978, 7 pages.

*Primary Examiner*—David H. Malzahn
(74) *Attorney, Agent, or Firm*—Lawrence J. Merkel; Meyertons, Hood, Kivlin, Kowert & Goetzel, P.C.

(57) ABSTRACT

A mask generator circuit includes at least first and second mask generator circuits coupled to receive most significant and least significant sections of the pointer and to generate masks therefrom, and a plurality of circuits each configured to generate a region of the output mask from the mask generator circuit. The mask generated from the most significant bits section of the pointer (the most significant bits (MSB) mask) includes bits corresponding to various regions of the output mask. The plurality of circuits receive the MSB mask and the least significant bits (LSB) mask generated from the least significant bits section of the pointer and generate the output mask therefrom.

20 Claims, 7 Drawing Sheets

U.S. PATENT DOCUMENTS

| | | |
|---|---|---|
| 5,589,991 A | 12/1996 | Bleier |
| 5,598,546 A | 1/1997 | Blomgren |
| 5,608,887 A | 3/1997 | Dinkjian et al. |
| 5,680,564 A | 10/1997 | Divivier et al. |
| 5,729,725 A * | 3/1998 | Kato et al. ................. 712/224 |
| 5,748,978 A | 5/1998 | Narayan et al. |
| 5,758,114 A | 5/1998 | Johnson et al. |
| 5,781,789 A | 7/1998 | Narayan |
| 5,826,071 A | 10/1998 | Narayan |
| 5,935,239 A | 8/1999 | Narayan |
| 5,995,748 A * | 11/1999 | Guttag et al. ................ 712/221 |
| 6,098,087 A * | 8/2000 | Lemay ....................... 708/209 |
| 6,098,163 A * | 8/2000 | Guttag et al. ................. 712/20 |

\* cited by examiner

| In[3:0] | Mask[3:0] from In[3:2] | Mask[3:0] from In[1:0] | Out[15:0] |
|---|---|---|---|
| 0000 | 1111 | 1111 | 1111 1111 1111 1111 |
| 0001 | 1111 | 1110 | 1111 1111 1111 1110 |
| 0010 | 1111 | 1100 | 1111 1111 1111 1100 |
| 0011 | 1111 | 1000 | 1111 1111 1111 1000 |
| 0100 | 1110 | 1111 | 1111 1111 1111 0000 |
| 0101 | 1110 | 1110 | 1111 1111 1110 0000 |
| 0110 | 1110 | 1100 | 1111 1111 1100 0000 |
| 0111 | 1110 | 1000 | 1111 1111 1000 0000 |
| 1000 | 1100 | 1111 | 1111 1111 0000 0000 |
| 1001 | 1100 | 1110 | 1111 1110 0000 0000 |
| 1010 | 1100 | 1100 | 1111 1100 0000 0000 |
| 1011 | 1100 | 1000 | 1111 1000 0000 0000 |
| 1100 | 1000 | 1111 | 1111 0000 0000 0000 |
| 1101 | 1000 | 1110 | 1110 0000 0000 0000 |
| 1110 | 1000 | 1100 | 1100 0000 0000 0000 |
| 1111 | 1000 | 1000 | 1000 0000 0000 0000 |

Region 0: rows 0000–0011
Region 1: rows 0100–0111
Region 2: rows 1000–1011
Region 3: rows 1100–1111

PARALLEL MASK GENERATOR

BACKGROUND OF THE INVENTION

1. Field of the Invention

This invention is related to the field of digital devices and, more particularly, to mask generators.

2. Description of the Related Art

Mask generators have a wide variety of uses in digital devices. For example, in processors, mask generators are used to generate masks to identify valid instruction bytes fetched from an instruction cache (e.g. the bytes in the cache line which are subsequent to the fetch address offset with the cache line or prior to a predicted-taken branch within the cache line), to identify cache memory array columns which are selected for use (e.g. programming the redundant columns in the array), etc.

In the past, mask generators which generate masks having a single transition between a binary one and a binary zero (e.g. a set of consecutive binary ones on one side of the transition point and a set of consecutive binary zeros on the other side of the transition point, such as 0011 or 1110 for a four bit mask) have been simple ripple designs. Generally, such a mask generator receives a pointer indicating the location of the transition within the mask. The pointer is decoded to generate a set of output bits corresponding to each mask bit, with the bit corresponding to the location indicated by the pointer being set and the other bits being clear (or vice versa). A particular mask bit is then generated as a logical OR of the decoder bits corresponding to all less significant mask bits than that particular mask bit. While such a circuit may be useful for small masks, generating wider masks in this fashion leads to large and slow circuits for performing the wide OR functions.

Another type of mask generator is described in U.S. Pat. No. 5,935,239, incorporated herein by reference in its entirety. The mask generator in this patent generates a mask from the least significant bits of the pointer and provides the mask to a set of multiplexors which also receive a range of all binary zeros and all binary ones. Each of the multiplexors provides a portion of the output mask. Selection controls for the multiplexors are generated from the most significant bits of the pointer to select the appropriate multiplexor input for each portion of the output mask. Unfortunately, even this solution may be cumbersome and slow, limiting its usefulness as operating frequencies of digital devices increase.

SUMMARY OF THE INVENTION

A mask generator circuit includes at least first and second mask generator circuits coupled to receive most significant and least significant sections of the pointer and to generate masks therefrom, and a plurality of circuits each configured to generate a region of the output mask from the mask generator circuit. The mask generated from the most significant bits section of the pointer (the most significant bits (MSB) mask) includes bits corresponding to various regions of the output mask. The plurality of circuits receive the MSB mask and the least significant bits (LSB) mask generated from the least significant bits section of the pointer and generate the output mask therefrom. The number of levels of logic required to generate the mask may be reduced, which may provide for mask generation at higher clock frequencies than previously possible. Furthermore, in certain embodiments, the number of gates used and the fanout on the signals may be limited, which may provide for scalability and low area usage.

Broadly speaking, a mask generator for generating an output mask having a transition between a binary one and a binary zero at a location in the output mask identified by a pointer provided to the mask generator is contemplated. The mask generator includes a first mask generator, a second mask generator, and a plurality of circuits coupled thereto. The first mask generator is coupled to receive a plurality of most significant bits of the pointer and is configured to generate a first mask in response thereto. Each bit of the first mask corresponds to a respective region of the output mask and is indicative, in a first state, that the transition either occurs in a less significant region than the respective region or occurs in the respective region. The bit is further indicative, in a second state, that the transition occurs in a more significant region of the output mask than the respective region. The second mask generator is coupled to receive a plurality of least significant bits of the pointer and is configured to generate a second mask in response thereto. The plurality of circuits are configured to generate the output mask responsive to the first and second masks. The plurality of circuits includes a first circuit configured to generate a first region of the output mask. The first circuit is coupled to receive a first bit of the first mask, the first bit corresponding to the first region of the output mask. The first circuit is further coupled to receive a second bit of the first mask, the second bit corresponding to a neighboring region to the first region, the neighboring region being a less significant region of the output mask. Additionally, the first circuit is coupled to receive bits of the second mask. The first circuit is configured to generate the first region of the output mask responsive to the first bit, the second bit, and the bits of the second mask.

Additionally, a method for generating an output mask having a transition between a binary one and a binary zero at a location in the output mask identified by a pointer is contemplated. A first mask is generated responsive to a plurality of most significant bits of the pointer. Each bit of the first mask corresponds to a respective region of the output mask and is indicative, in a first state, that the transition either occurs in a less significant region than the respective region or occurs in the respective region, and is further indicative, in a second state, that the transition occurs in a more significant region of the output mask than the respective region. A second mask is generated responsive to a plurality of least significant bits of the pointer. A first region of the output mask is generated responsive to: (i) a first bit of the first mask, the first bit corresponding to the first region of the output mask; (ii) a second bit of the first mask, the second bit corresponding to a neighboring region to the first region, the neighboring region being a less significant region of the output mask; and (iii) bits of the second mask.

BRIEF DESCRIPTION OF THE DRAWINGS

The following detailed description makes reference to the accompanying drawings, which are now briefly described.

FIG. 2 is a truth table for the embodiment of FIG. 1

Figure 1:
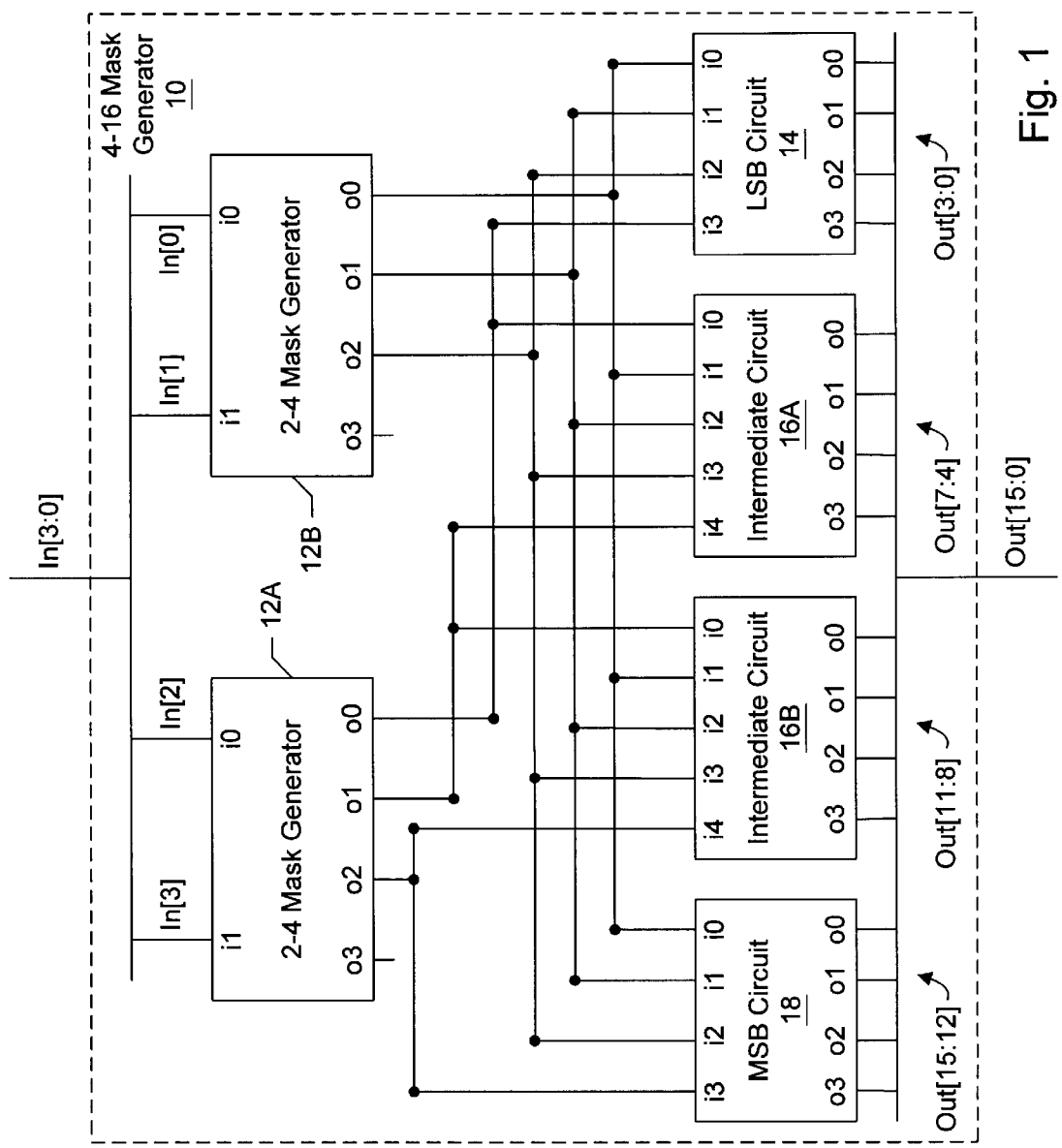
FIG. 1 is a block diagram of one embodiment of a mask generation circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a mask generator 10 is shown. Other embodiments are possible and contemplated. In the embodiment of FIG. 1, the mask generator 10 is a 4-16 mask generator receiving a 4 bit pointer (In[3:0]) and generates a corresponding 16 bit output mask (Out[15:0]) having a transition at the location indicated by the pointer. Other input pointer and output mask sizes are contemplated, as will be described in more detail below. In the embodiment of FIG. 1, the mask generator 10 includes two mask generators 12A and 12B. The pointer is divided into two sections, the most significant bits and the least significant bits. The mask generator 12A is coupled to receive the most significant bits of the pointer (In[3:2] in the illustrated embodiment), while the mask generator 12B is coupled to receive the least significant bits of the pointer (In[1:0] in the illustrated embodiment). Each of the mask generators 12A-12B outputs a mask on output terminals o0-o3. Mask bit o0 is the least significant bit of the mask, bit o1 is the next least significant, etc., up to most significant mask bit o3. The mask generator 10 further includes a plurality of circuits for generating the output mask from the masks provided by mask generators 12A-12B. Particularly, a least significant bits (LSB) circuit 14, a set of intermediate circuits 16A-16B, and a most significant bits (MSB) circuit 18 are included. Each of the circuits 14, 16A-16B, and 18 receive mask bits from mask generators 12A-12B and generate a region of the output mask Out[15:0]as shown in FIG. 1. It is noted that the input terminals (e.g. i0 and i1 on the mask generator 12A) and the output terminals (e.g. o0, o1, o2, and o3 on the mask generator 12A) are provided for mapping inputs to the circuit diagrams shown in FIGS. 3-10.

Each of the circuits 14, 16A-16B and 18 is coupled to the o0, o1, and o2 mask bits of the mask generator 12B. The circuits 14 and 18 receive the o0, o1, and o2 mask bits on inputs i0, i1, and i2, respectively. The circuits 16A-16B receive the o0, o1, and o2 mask bits on inputs i1, i2, and i3, respectively. Additionally, each of the circuits 14, 16A-16B, and 18 receives at least one mask bit from the mask generator 12A. Particularly, the LSB circuit 14 receives the mask bit o0 (input i3); the intermediate circuit receives the mask bit o0 (input i0) and the mask bit o1 (input i4); the intermediate circuit 16B receives the mask bit o1 (input i0) and the mask bit o2 (input i4); and the MSB circuit receives the mask bit o2 (input i3).

The operation of the mask generator 10 in general may be more easily understood with reference to a truth table 20 shown in FIG. 2. Each input pointer In[3:0] value is shown in the table, along with the corresponding output mask out[15:0]. Thus, in this embodiment, the pointer indicates a transition (when viewed from the least significant bit to the most significant bit) from 0 to 1 at the position in the mask indicated by the pointer. Alternatively, the pointer can indicate a transition from 1 to 0 at the position in the mask indicated by the pointer. The circuits shown in FIGS. 4-6 and 8-10 may include an inverter on the output to produce such an output mask, or the inversion may be incorporated into the logic gates, as desired. In general, therefore, the mask generator may generate a mask having a transition between 0 and 1 at a location indicated by the pointer. As used herein, a transition in a mask occurs at a first bit in the mask if each less significant bit than the first bit is in a first state (e.g. binary zero or binary one) and each more significant bit than the first bit is in a second state (e.g. binary one or binary zero).

Also shown in table 20 is the mask outputs from the mask generators 12A (the column labeled Mask[3:0]from In[3:2]) and 12B (the column labeled Mask[3:0] from In[1:0]). The mask from the mask generator 12A will be referred to as the MSB mask below, and the mask from the mask generator 12B will be referred to as the LSB mask. Furthermore, a bit from the MSB mask is referred to as an MSB mask bit, and a bit from the LSB mask is referred to as an LSB mask bit.

Generally speaking, the output mask can be viewed as having regions, each region identified by a different encoding of the most significant bits section of the pointer. In this embodiment, since the most significant bits section is two bits, there are four regions. The number of mask bits included in a region is dependent on the number of bits in the least significant bits section of the pointer (more particularly, 2 raised to the Nth power, where N is the number of bits in the least significant bits section of the pointer). In this embodiment, there are two bits in the least significant bits section and thus four mask bits in each region. A space is included in the Out[15:0] entries of table 20 between the mask bits belonging to each region. Generally, the encoding of the most significant bits section of the pointer identifies which of the regions of the output mask includes the transition for the mask to be generated. Heavy horizontal lines are drawn on table 20 to identify which encodings of the pointer In[3:0] identify which regions of the output mask as including the transition (e.g. encodings 0000 through 0011 identify region 0, the least significant region in the output mask, encodings 0100 through 0111 identify region 1, the second least significant region in the output mask, etc. as shown in FIG. 2).

In a manner similar to identifying more significant and less significant bits, regions in the output mask may be viewed as more significant or less significant. Generally, a first region is "more significant" that a second region if the bits included in the first region are more significant than the bits in the second region. A first region is "less significant" than a second region if the bits included in the first region are less significant than the bits in the second region. In the illustrated embodiment, a bit is more significant than another bit if its bit number is greater than the bit number of the other bit, and is less significant if its bit number is less than the bit number of the other bit. Generally, a bit may be defined to be more significant or less significant in any suitable fashion, e.g. numerically, logically, etc. In the embodiment illustrated in FIG. 2, region 0 includes mask bits 3:0 and is the least significant region; region 1 includes mask bits 7:4 and is more significant than region 0 and less significant than regions 2 and 3; region 2 includes mask bits 11:8 and is more significant than regions 0 and 1 and less significant than region 3; and region 3 includes mask bits 15:12 and is the most significant region.

Another concept which will be useful in describing the operation of the mask generator 10 is neighboring regions. Generally, a first region is a "neighboring region" to a second region if one of the output mask bits included in the first region is adjacent, in the output mask, to one of the output mask bits included in the second region. Thus, regions 2 and 0 are neighboring regions to region 1, in the embodiment of FIG. 2.

The MSB mask may be used to identify which region of the output mask includes the mask's transition between 0 and 1. Generally, each bit of the MSB mask corresponds to a given region. The least significant bit (bit 0) of the MSB mask corresponds to region 0, the next least significant bit (bit 1) corresponds to region 1, etc. The MSB mask bit corresponding to the region indicates, when set, that the transition in the output mask occurs in the corresponding region or in a less significant region. The MSB bit corresponding to the region indicates, when clear, that the transition occurs in a more significant region. To identify, for a given region, whether or not that region is the region in which the transition occurs, the MSB mask bit corresponding to that region and the MSB mask bit corresponding to the neighboring, less significant region to that region may be used. If the MSB mask bit corresponding to the neighboring, less significant region is clear and the MSB mask bit corresponding to the given region is set, the transition occurs in the given region. The sense of the mask bits may also be reversed, in other embodiments (i.e. the meanings of the clear and set mask bits may be reversed from the definition above). Thus, in general, a first state of the MSB mask bit indicates that the transition in the output mask occurs in the corresponding region or in a less significant region and a second state of the MSB mask bit indicates that the transition occurs in a more significant region.

As table 20 illustrates, the LSB mask is equal to the mask bits included in the region of the output mask which includes the mask's transition. Viewed in another way, since the most significant bits of the pointer identify the region in which the transition occurs, the least significant bits of the pointer identify the offset within the identified region at which the transition occurs.

Accordingly, in general, a circuit for generating a particular region of the output mask may receive the MSB mask bit corresponding to that region, the MSB mask bit corresponding to the neighboring, less significant region, and the LSB mask. If the MSB mask bit corresponding to the neighboring, less significant region is set, then the transition occurs in a less significant region to the particular region and thus the particular region is filled with binary ones. If the MSB mask bit corresponding to the neighboring, less significant region is clear and the MSB mask bit corresponding to the particular region is set, then the transition occurs within the particular region and thus the particular region is filled with mask bits corresponding to the LSB mask. If both MSB mask bits are clear (or, alternatively, if the MSB mask bit corresponding to the particular region is clear), then the transition occurs in a more significant region and thus the particular region is filled with binary zeros. Again, as mentioned above, the mask may be defined to transition in either direction, so whether binary zeros or binary ones are used in the above description may change based on the desired output mask.

The above general description is the operation of the intermediate circuits 16A–16B. The LSB and MSB circuits 14 and 18 are similar, but are somewhat simplified. For example, in the case of the LSB circuit 14, there is no neighboring, less significant region and thus no MSB mask bit corresponding to the neighboring, less significant region. Accordingly, the LSB circuit 14 receives the MSB mask bit corresponding to the least significant region and the LSB mask. If the MSB mask bit is set, the transition occurs in the least significant region and thus the least significant region is filled with mask bits corresponding to the LSB mask. If the MSB mask bit is clear, the transition occurs in a more significant region and thus the least significant region is filled with binary zeros. Alternatively, the LSB circuit 14 may be implemented with an intermediate circuit with input i0 tied to binary zero and the inputs i0–i3 of the LSB circuit tied to the inputs i1–i4 of the intermediate circuit, respectively.

The MSB circuit 18 may differ since the MSB mask bit corresponding to the most significant region is always one (the transition always occurs in the most significant region or in a region less significant than the most significant region). Accordingly, the MSB circuit 18 receives the MSB mask bit corresponding to the second most significant region (region 2 in the illustrated embodiment) and the LSB mask. If the MSB mask bit corresponding to region 2 is clear, then the MSB circuit 18 fills the most significant region with mask bits corresponding to the LSB mask. If the MSB mask bit corresponding to region 2 is set, then the MSB circuit 18 fills the most significant region with binary ones. Alternatively, the MSB circuit 18 may be implemented as an intermediate circuit with the i0–i3 inputs connected to the i0–i3 inputs of the intermediate circuit and the i4 input tied to binary 1 (or to the output o3 of the mask generator 12A).

While the embodiment illustrated in FIG. 1 is a 4–16 mask generator, other embodiments may be employ any size pointer (and the corresponding mask output size) and may divide the pointer into any combination of a most significant bits section and a least significant bits section. Preferably, if the number of pointer bits is even, the pointer may be divided into equal sized most significant bits and least significant bits sections. If the number of pointer bits is odd, preferably the most significant bits section is one bit greater than the least significant bits section. For example, a 5–32 mask generator might employ a two bit least significant bits section (and thus mask generator 12B may be a 2–4 mask generator as shown in FIG. 1) and a three bit most significant bits section (and thus mask generator 12A may be a 3–8 mask generator). This configuration gives a relatively balanced fan out on the mask bits from the two mask generators 12A–12B, wherein a three bit least significant bits section and a two bit most significant bits section leads to a higher fan out on the mask bits from the mask generator 12A. While the above divisions of the pointer may be preferred, any division may be used. The choice of division may depend, at least in part, on the amount of wiring space required (higher fan out) versus the number of gates required (and the space they consume), as well as on the timing of the circuit as a whole (wider fan outs and larger numbers of logic levels typically impact timing negatively). Furthermore, the divisions may be based on the maximum numbers of inputs for logic gates in the mask generators 12A–12B. If the number of inputs needed exceeds the maximum number, then multiple logic levels may be needed in the mask generators 12A–12B. The sum of the number of bits in each section is equal to the number of bits in the pointer. Additionally, the number of circuits used to generate the output mask may be a function of the number of bits in the most significant bits section (i.e. 2 raised to the power N, wherein N is the number of bits in the most significant bits section).

Additionally, even wider mask generators may be realized using mask generators similar to mask generator 10 as the first level (with as many mask generators in parallel as desired to handle the pointer bits) and additional levels of circuitry similar to circuits 14, 16A–16B, and 18. An example is shown and described in more detail below with FIG. 11.

Figure 3:
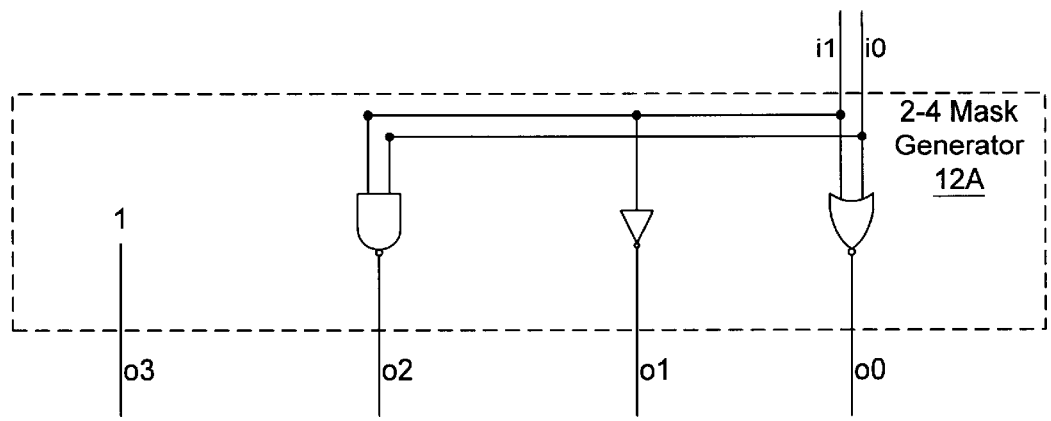
FIG. 3 is a circuit diagram of one embodiment of a 2-4 mask generator circuit shown in FIG. 1.

Turning next to FIG. 3, a circuit diagram of one embodiment of mask generator 12A is shown. Other embodiments are possible and contemplated. The mask generator 12B may employ the same circuit in the embodiment illustrated in FIG. 1. It is noted that, since the output o3 is not used in the illustrated embodiment, the output may be deleted in alternative embodiments.

Figure 4:
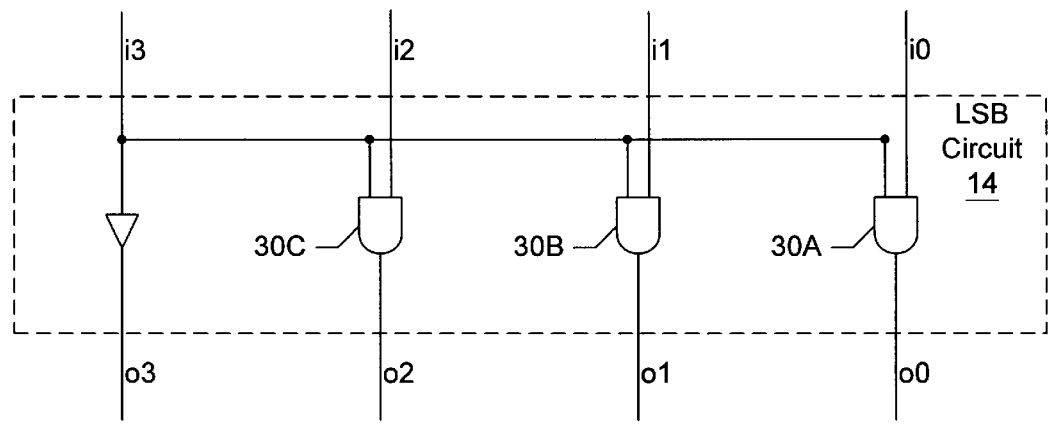
FIG. 4 is a circuit diagram of one embodiment of a least significant bits (LSB) mask generator circuit shown in FIG. 1.

Turing now to FIG. 4, a circuit diagram of one embodiment of the LSB circuit 14 is shown. Other embodiments are possible and contemplated. Each of AND gates 30A–30C receives a mask bit from the corresponding position of the LSB mask from mask generator 12B (inputs i0, i1, and i2, respectively), and the MSB mask bit from mask generator 12A (input i3). If the MSB mask bit is set, then the LSB mask bit from mask generator 12B is passed through on the corresponding output by the corresponding AND gate 30A–30C. If the MSB mask bit is clear, then the output is zero for each bit in the region. It is noted that the most significant bit in the region is always one unless the region is filled with zeros, and thus a buffer of the MSB mask bit forms the output.

Figure 5:
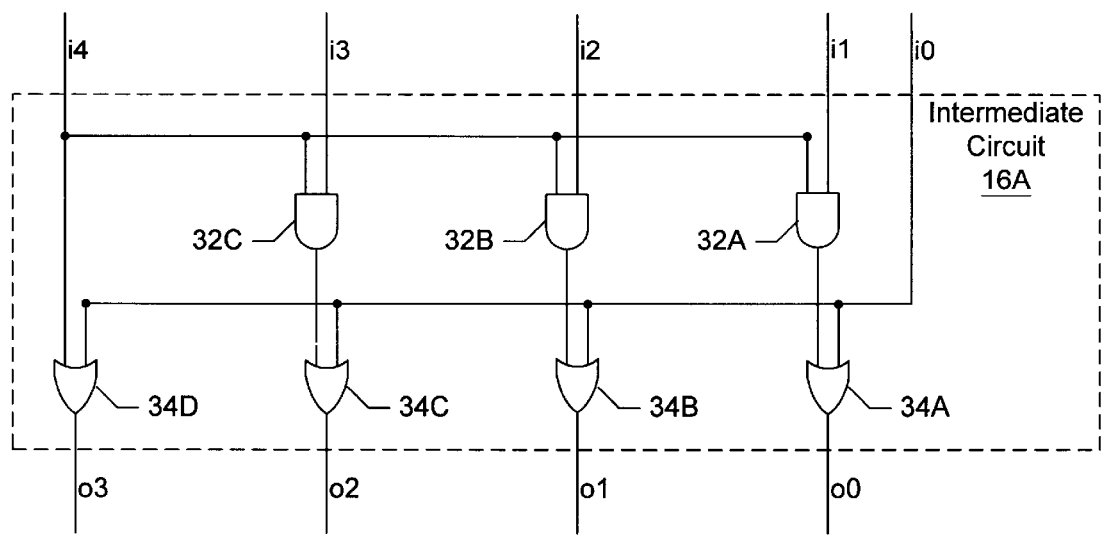
FIG. 5 is a circuit diagram of one embodiment of an intermediate mask generator circuit shown in FIG. 1.

FIG. 5 is a circuit diagram of one embodiment of the intermediate circuit 16A. The intermediate circuit 16B may employ the same circuit. Other embodiments are possible and contemplated. In the embodiment of FIG. 5, each of the LSB mask bits (inputs i1, i2, and i3) are fed to AND gates 32A–32C, which also receive the MSB mask bit corresponding to the region being generated by the intermediate circuit 16A (input i4). Similar to the LSB circuit 14, if the MSB mask bit is set, then the LSB mask bit from mask generator 12B is passed through the corresponding AND gate 32A–32C. If the MSB mask bit is clear, then the output of each AND gate 32A–32C is zero. Each of AND gates 32A–32C is coupled to a respective OR gate 34A–34C, which also receives the MSB mask bit from the neighboring, less significant region (input i0). An additional OR gate 34D receives the inputs i0 and i4. If the input i0 is set, then the output of each OR gate 34A–34D is a binary one. If the input i0 is clear, the output of the AND gates 32A–32C are passed to the outputs by OR gates 34A–34C and the input i4 is passed to the output by OR gate 34D. Thus, the intermediate circuit 16A outputs binary zeros if neither MSB mask bit is set, binary ones of the MSB mask bit corresponding to the neighboring, less significant region is set, and mask bits corresponding to the LSB mask if the MSB mask bit corresponding to the region is set and the MSB mask bit corresponding to the neighboring, less significant region is clear.

Figure 6:
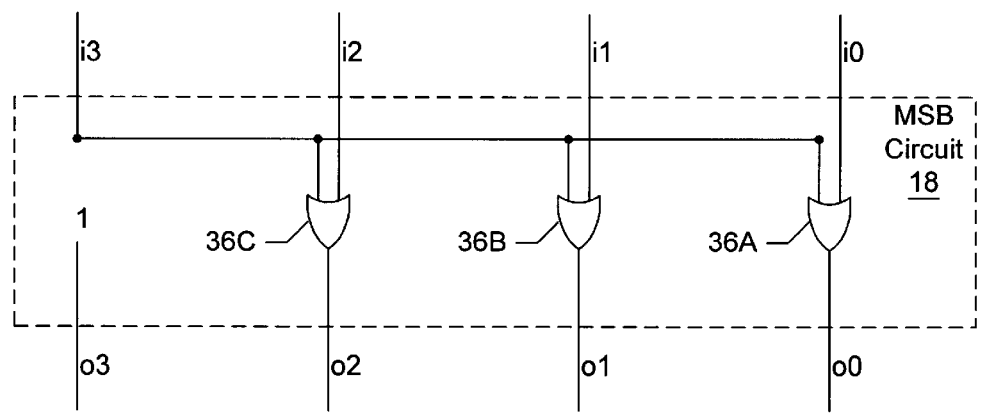
FIG. 6 is a block diagram of one embodiment of an most significant bits (MSB) mask generator circuit shown in FIG. 1.
Figure 7:
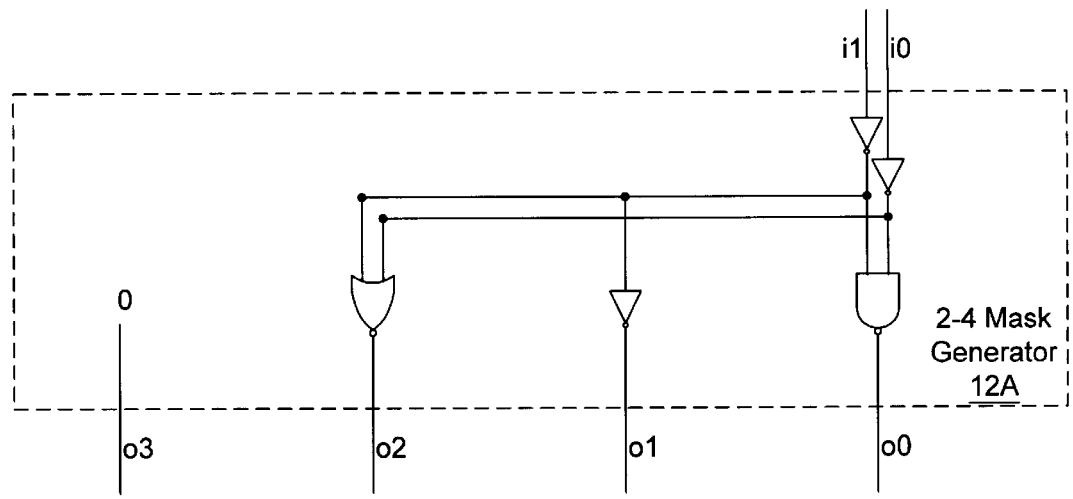
FIG. 7 is a circuit diagram of a second embodiment of a 2-4 mask generator circuit shown in FIG. 1.
Figure 8:
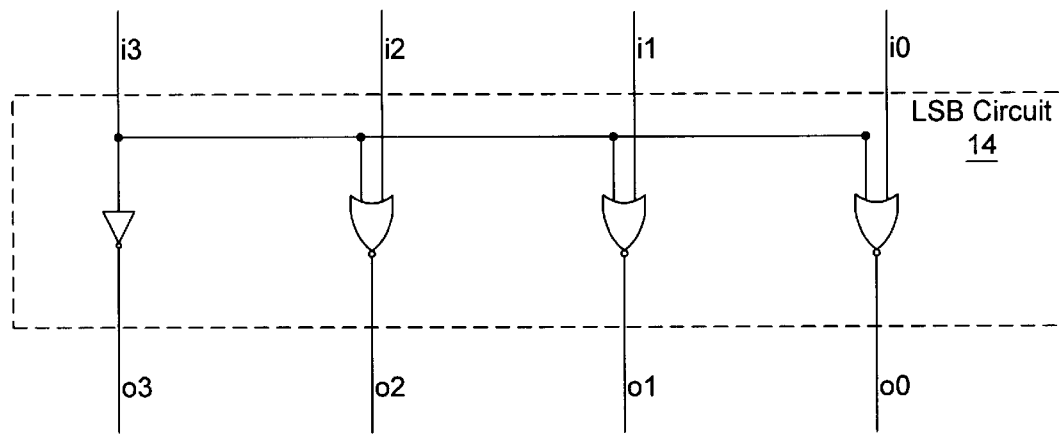
FIG. 8 is a circuit diagram of a second embodiment of a least significant bits (LSB) mask generator circuit shown in FIG. 1.
Figure 9:
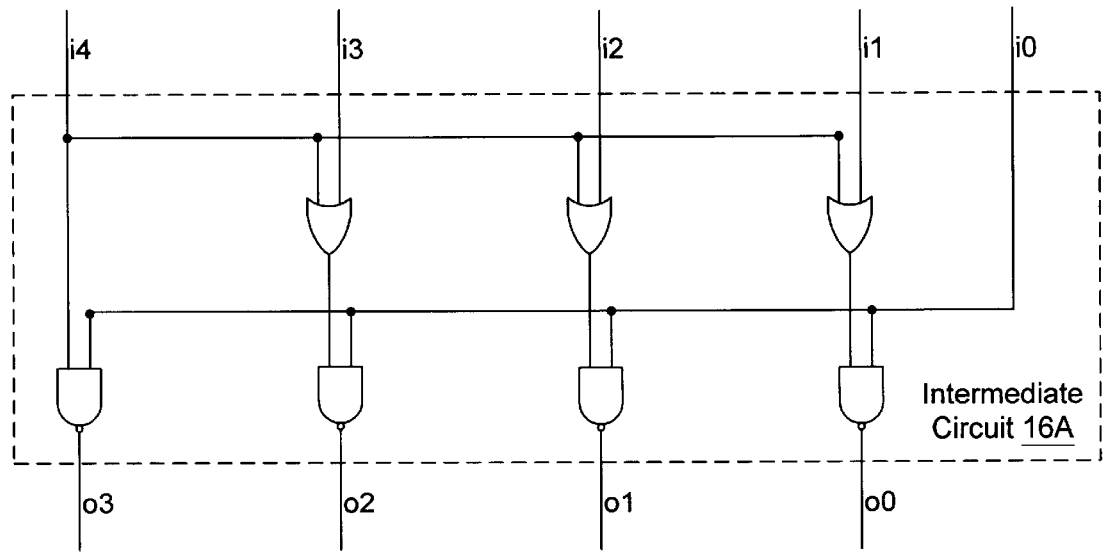
FIG. 9 is a circuit diagram of a second embodiment of an intermediate mask generator circuit shown in FIG. 1.
Figure 10:
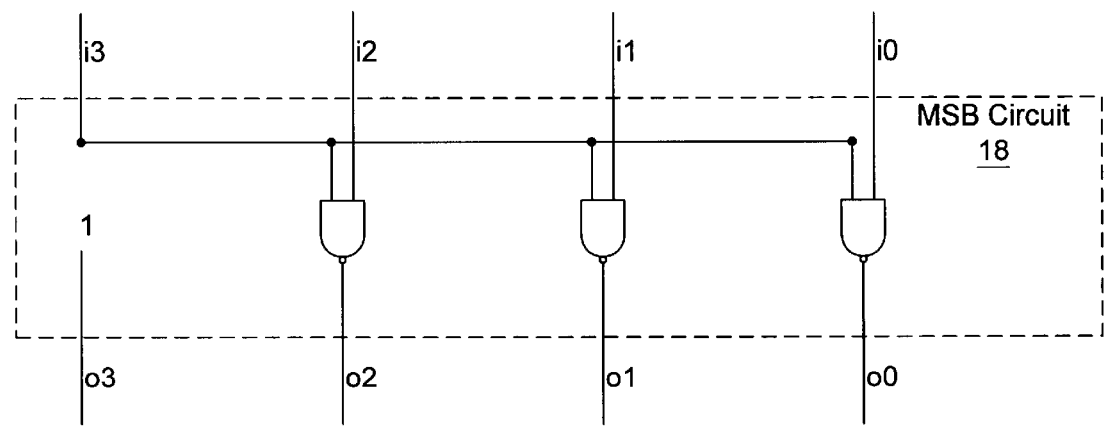
FIG. 10 is a block diagram of a second embodiment of an most significant bits (MSB) mask generator circuit shown in FIG. 1.

Turning next to FIG. 6, a circuit diagram of one embodiment of MSB circuit 18 is shown. Other embodiments are possible and contemplated. In the embodiment of FIG. 6, MSB circuit 18 includes OR gates 36A–36C. Each OR gate 36A–36C receives an LSB mask bit (inputs i0, i1, and i2) and the MSB mask bit corresponding to the second most significant region (input i3). If the MSB mask bit is set, each OR gate 36A–36C outputs a binary one. Otherwise, the input i0, i1, and i2 are output. Output o3 (the most significant bit of the output mask) is always 1.

As FIGS. 3–6 illustrate, a relatively small number of logic levels are involved in generating the output mask. For example, in the illustrated embodiment, 3 levels of logic (plus output inverters integrated into AND and OR gates in CMOS technology) are used (one level in mask generators 12A and 12B, two levels in intermediate circuits 16A–16B). Thus, a high speed mask generation may be possible. Furthermore, each output mask bit is generated using independent circuitry (e.g. OR gate 34A and AND gate 32A are independent of OR gate 34B and AND gate 32B). Accordingly, the circuits 14, 16A–16B, and 18 may scale well to larger numbers of output bits (larger output masks). Fan out of the input signals may be a factor in the number of output bits each circuit may have. Furthermore, the number of intermediate circuits may be large, allowing for a large number of output mask bits. Fan out of the MSB mask may be a factor in the number of intermediate circuits that may be used.

An alternative embodiment to FIGS. 3–6 is illustrated in FIGS. 7–10, respectively. In this embodiment, the input pointer bits are inverted in mask generator 12A (and 12B) and the complement of each circuit 12A–12B, 14, 16A–16B, and 18 is used. Such an embodiment may be used, in CMOS implementations, in which a lighter load is expected. The embodiment of FIGS. 7–10 includes fewer output inverters (e.g. AND gates are NAND gates followed by inverters) and thus fewer transistors are used.

Figure 11:
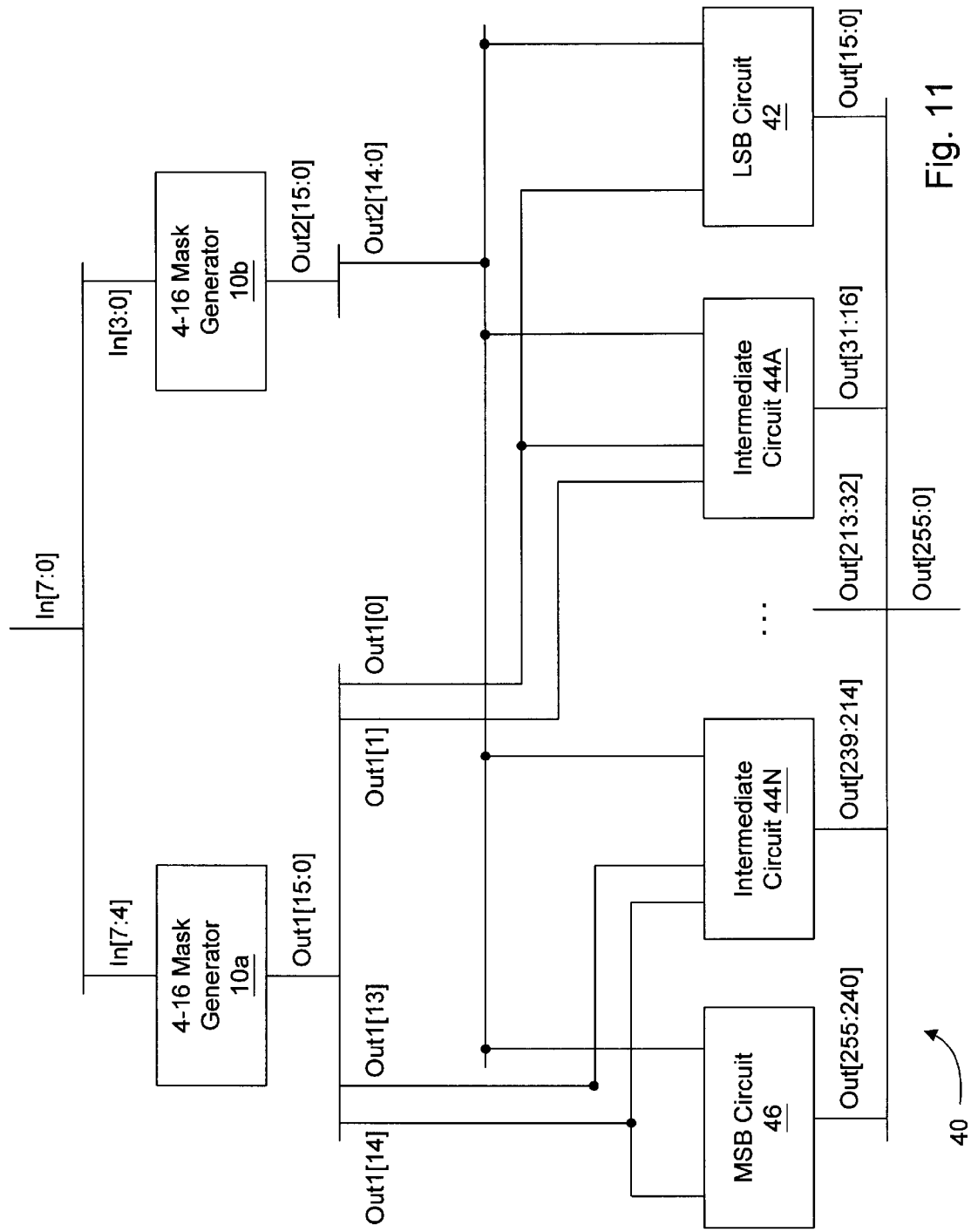
FIG. 11 is a block diagram of one embodiment of an 8-256 mask generator circuit.

Turning now to FIG. 11, one embodiment of an 8-256 bit mask generator 40 is shown. Other embodiments are possible and contemplated. In the embodiment of FIG. 11, mask generator 40 includes two instantiations of mask generator 10 (reference numerals 10a–10b) which form the mask generators for the most significant bits and least significant bits of pointer In[7:0]. Each mask generator 10a–10b outputs a 16 bit mask. The mask output from mask decoder 10b is the LSB mask and the mask output from mask decoder 10a is the MSB mask. Additionally, mask generator 40 includes an LSB circuit 42, intermediate circuits 44A–44N (a total of 14, two of which are shown explicitly in FIG. 11), and an MSB circuit 46. Each of the circuits 42, 44A–44N, and 46 is coupled to receive the LSB mask bits (Out[14:0]), and respective MSB mask bits for the region being generated by that circuit. Particularly, for example, LSB circuit 42 receives the MSB mask bit corresponding to the least significant region (Out1[0]); intermediate circuit 44A receives Out1[0] and Out1[1]; intermediate circuit 44N receives Out1[13] (the MSB mask bit corresponding to the neighboring, less significant region to the region generated by intermediate circuit 44N) and Out1[14] (the MSB mask bit corresponding to the region generated by intermediate circuit 44N); and MSB circuit 46 receives Out1[14].

The operation of the LSB circuit 42, intermediate circuits 44A–44N, and MSB circuit 46 may be generally similar to the LSB circuit 14, intermediate circuits 16A–16B, and MSB circuit 18. In this embodiment, each circuit produces a 16 bit region of the output mask, and thus the parallel, independent circuits of FIGS. 4–6 (or FIGS. 8–10) may be repeated to produce the additional bits and the circuits may receive additional inputs. For example, intermediate circuits 44A–44N may each include 15 circuits similar to AND gate 32A and OR gate 34A of FIG. 5, each receiving a respective bit of the LSB mask (Out2[14:0]), the MSB mask bit corresponding to the neighboring, less significant region (input to the OR gates) and the MSB mask bit corresponding to the region (input to the AND gates). The OR gate 34D may further be included as shown in FIG. 5. The other circuits may similarly be expanded.

Additional cascading of circuits which receive mask bits generated from least significant and most significant bits of larger pointers maybe used to generate additional mask widths. For example, two parallel instantiations of mask generator 40 may be used with another level of circuits similar to the LSB, MSB, and intermediate circuits described above to form a 16-65,536 mask generator circuit (one of the mask generator 40 instantiations receiving the most significant 8 bits an the other receiving the least significant 8 bits of the input pointer). The additional level of LSB, MSB, and intermediate circuits may each generator a 256 bit region of the 65,536 bit output mask.

Numerous variations and modifications will become apparent to those skilled in the art once the above disclosure is fully appreciated. It is intended that the following claims be interpreted to embrace all such variations and modifications.

What is claimed is:

1. A mask generator for generating an output mask having a transition between a binary one and a binary zero at a location in the output mask identified by a pointer provided to the mask generator, the mask generator comprising:

a first mask generator coupled to receive a plurality of most significant bits of the pointer and configured to generate a first mask in response thereto, each bit of the first mask corresponding to a respective region of the output mask and indicative, in a first state, that the transition either occurs in a less significant region than the respective region or occurs in the respective region, and indicative, in a second state, that the transition occurs in a more significant region of the output mask than the respective region;

a second mask generator coupled to receive a plurality of least significant bits of the pointer and configured to generate a second mask in response thereto; and a plurality of circuits coupled to the first mask generator and the second mask generator, wherein the plurality of circuits are configured to generate the output mask responsive to the first and second masks, and wherein the plurality of circuits includes a first circuit, the first circuit configured to generate a first region of the output mask, and wherein the first circuit is coupled to receive a first bit of the first mask, the first bit corresponding to the first region of the output mask, and wherein the first circuit is coupled to receive a second bit of the first mask, the second bit corresponding to a neighboring region to the first region, the neighboring region being a less significant region of the output mask, and wherein the first circuit is coupled to receive bits of the second mask, and wherein the first circuit is configured to generate the first region of the output mask responsive to the first bit, the second bit, and the bits of the second mask.

2. The mask generator as recited in claim 1 wherein the first circuit is configured to generate a third state for each bit in the first region of the output mask responsive to the second bit being in the first state, and wherein the first circuit is configured to generate a state indicated by a corresponding bit of the second mask for respective bits of the first region responsive to the first bit being in the first state and the second bit being in the second state, and wherein the first circuit is configured to generate a fourth state for each bit in the first region responsive to both the first bit and the second bit being in the second state, the fourth state being different from the third state.

3. The mask generator as recited in claim 2 wherein the third state is a binary one and the fourth state is a binary zero.

4. The mask generator as recited in claim 2 wherein the third state is a binary zero and the fourth state is a binary one.

5. The mask generator as recited in claim 1 wherein the plurality of circuits further comprises a second circuit, the second circuit configured to generate a most significant region of the output mask, wherein the second circuit is coupled to receive a third bit of the first mask, the third bit corresponding to a second neighboring region to the most significant region, and wherein the second circuit is coupled to receive bits of the second mask, and wherein the second circuit is configured to generate the most significant region of the output mask responsive to the third bit and the bits of the second mask.

6. The mask generator as recited in claim 5 wherein the second circuit is configured to generate a third state for each bit in the most significant region of the output mask responsive to the third bit being in the first state, and wherein the second circuit is configured to generate the state indicated by the corresponding bit of the second mask for respective bits of the most significant region responsive to the third bit being in the second state.

7. The mask generator as recited in claim 1 wherein the plurality of circuits further comprises a second circuit, the second circuit configured to generate a least significant region of the output mask, wherein the second circuit is coupled to receive a third bit of the first mask, the third bit corresponding to the least significant region, and wherein the second circuit is coupled to receive bits of the second mask, and wherein the second circuit is configured to generate the least significant region of the output mask responsive to the third bit and the bits of the second mask.

8. The mask generator as recited in claim 7 wherein the second circuit is configured to generate a fourth state for each bit in the least significant region of the output mask responsive to the third bit being in the second state, and wherein the second circuit is configured to generate a state indicated by a corresponding bit of the second mask for respective bits of the least significant region responsive to the third bit being in the first state.

9. The mask generator as recited in claim 1 wherein a sum of a number of the least significant bits of the pointer and a number of the most significant bits of the pointer is equal to a number of bits of the pointer.

10. The mask generator as recited in claim 1 wherein a number of the least significant bits of the pointer is equal to a number of the most significant bits of the pointer if a number of bits of the pointer is even.

11. The mask generator as recited in claim 1 wherein a number of the least significant bits of the pointer is one less than a number of the most significant bits of the pointer if a number bits of the pointer is odd.

12. The mask generator as recited in claim 1 wherein a number of the plurality of circuits is equal to 2 raised to the power N, wherein N is a number of the plurality of most significant bits of the pointer.

13. The mask generator as recited in claim 1 wherein the first mask generator comprises:

a third mask generator coupled to receive a plurality of most significant bits of the plurality of most significant bits of the pointer and configured to generate a third mask in response thereto, each bit of the third mask corresponding to a respective region of the first mask and indicative, in a first state, that the transition either occurs in a less significant region than the respective region or occurs in the respective region, and indicative, in a second state, that the transition occurs in a more significant region of the output mask than the respective region;

a fourth mask generator coupled to receive a plurality of least significant bits of the plurality of most significant bits of the pointer and configured to generate a second mask in response thereto; and a second plurality of circuits coupled to the third mask generator and the fourth mask generator, wherein the second plurality of circuits are configured to generate the first mask responsive to the third and fourth masks.

14. A method for generating an output mask having a transition between a binary one and a binary zero at a location in the output mask identified by a pointer, the method comprising:

generating a first mask responsive to a plurality of most significant bits of the pointer, wherein each bit of the first mask corresponds to a respective region of the output mask and is indicative, in a first state, that the transition either occurs in a less significant region than the respective region or occurs in the respective region, and indicative, in a second state, that the transition occurs in a more significant region of the output mask than the respective region;

generating a second mask responsive to a plurality of least significant bits of the pointer; and generating a first region of the output mask responsive to: (i) a first bit of the first mask, the first bit corresponding to the first region of the output mask; (ii) a second bit of the first mask, the second bit corresponding to a neighboring region to the first region, the neighboring region being a less significant region of the output mask; and (iii) bits of the second mask.

15. The method as recited in claim 14 wherein the generating a first region includes generating a third state for each bit in the first region of the output mask responsive to the second bit being in the first state, and wherein the generating a first region includes generating a state indicated by a corresponding bit of the second mask for respective bits of the first region responsive to the first bit being in the first state and the second bit being in the second state, and wherein the generating a first region of the output mask includes generating a fourth state for each bit in the first region responsive to both the first bit and the second bit being in the second state, the fourth state being different from the third state.

16. The method as recited in claim 14 further comprising generating a most significant region of the output mask responsive to: (i) a third bit of the first mask, the third bit corresponding to a second neighboring region to the most significant region; and (ii) the bits of the second mask.

17. The method as recited in claim 16 wherein the generating a most significant region includes generating the third state for each bit in the most significant region of the output mask responsive to the third bit being in the first state, and wherein the generating the most significant region includes generating the state indicated by the corresponding bit of the second mask for respective bits of the most significant region responsive to the third bit being in the second state.

18. The method as recited in claim 14 further comprising generate a least significant region of the output mask responsive to: (i) a third bit of the first mask, the third bit corresponding to the least significant region; and (ii) the bits of the second mask.

19. The method as recited in claim 18 wherein the generating the least significant region includes generating the fourth state for each bit in the least significant region of the output mask responsive to the third bit being in the second state, and wherein the generating the least significant bit of the output mask includes generating a state indicated by a corresponding bit of the second mask for respective bits of the least significant region responsive to the third bit being in the first state.

20. The method as recited in claim 14 wherein the generating a first mask comprises:

generating a third mask responsive to a plurality of most significant bits of the plurality of most significant bits of the pointer, each bit of the third mask corresponding to a respective region of the first mask and indicative, in a first state, that the transition either occurs in a less significant region than the respective region or occurs in the respective region, and indicative, in a second state, that the transition occurs in a more significant region of the output mask than the respective region;

generating a fourth mask responsive to a plurality of least significant bits of the plurality of most significant bits of the pointer; and generating the first mask responsive to the third and fourth masks.

* * * * *